US012321676B2

(12) United States Patent
Sun et al.

(10) Patent No.: US 12,321,676 B2
(45) Date of Patent: Jun. 3, 2025

(54) SYSTEM AND METHODS FOR MODELING AND SIMULATING ON-DIE CAPACITORS

(71) Applicant: Yangtze Memory Technologies Co., Ltd., Hubei (CN)

(72) Inventors: Peng Sun, Hubei (CN); Yuzhong Wang, Hubei (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 571 days.

(21) Appl. No.: 17/648,782

(22) Filed: Jan. 24, 2022

(65) Prior Publication Data
US 2023/0177246 A1    Jun. 8, 2023

Related U.S. Application Data

(63) Continuation of application No. PCT/CN2021/136269, filed on Dec. 8, 2021.

(51) Int. Cl.
*G06F 30/367* (2020.01)
*G01R 31/28* (2006.01)

(52) U.S. Cl.
CPC ....... *G06F 30/367* (2020.01); *G01R 31/2851* (2013.01)

(58) Field of Classification Search
CPC .......... G06F 30/367; G01R 31/2851
(Continued)

(56) References Cited

U.S. PATENT DOCUMENTS 5,903,469 A * 5/1999 Ho .................. G06F 30/398
716/115
6,671,862 B1 * 12/2003 Seward ............ G06F 30/367
716/113

(Continued)

FOREIGN PATENT DOCUMENTS

| CN | 109522653 A | 3/2019 |
| CN | 111554343 A | 8/2020 |
| TW | 201822041 A | 6/2018 |

OTHER PUBLICATIONS

International Search Report and Written Opinion of the International Searching Authority directed to International Patent Application No. PCT/CN2021/136269, mailed Sep. 7, 2022; 8 pages.

(Continued)

*Primary Examiner* — Jack Chiang
*Assistant Examiner* — Suchin Parihar
(74) *Attorney, Agent, or Firm* — HANLEY, FLIGHT & ZIMMERMAN, LLC

(57) ABSTRACT

The present disclosure is directed to methods and systems for analyzing integrated circuits. The method includes performing a first resistor capacitor (RC) extraction process on a power-receiving circuit and producing a first RC model. The method also includes scanning a netlist of a power distribution network, the power distribution network electrically connected to the power-receiving circuit. The method further includes determining a selection of circuit elements of the power distribution network based on a predetermined criteria. The method further includes performing a second RC extraction process on the selection of circuit elements and producing a second RC model. The method further includes performing a simulation process on the power-receiving circuit and the power distribution network using the first and second RC models.

20 Claims, 6 Drawing Sheets

(58) Field of Classification Search
USPC .......................................................... 716/103
See application file for complete search history.

(56) References Cited

U.S. PATENT DOCUMENTS

| | | | |
|---|---|---|---|
| 6,937,971 | B1 | 8/2005 | Smith et al. |
| 8,595,677 | B1 | 11/2013 | Shu et al. |
| 8,910,101 | B1 | 12/2014 | Yeh et al. |
| 10,467,375 | B2 * | 11/2019 | Lee ........................ G06F 30/398 |
| 2004/0111688 | A1 * | 6/2004 | Lee .......................... G06F 30/39 |
| | | | 716/103 |
| 2017/0177784 | A1 * | 6/2017 | Kalafala ................ G06F 30/367 |
| 2019/0138684 | A1 | 5/2019 | Lin et al. |
| 2020/0051863 | A1 * | 2/2020 | Chang ..................... H01L 24/42 |
| 2020/0233931 | A1 | 7/2020 | Kourkoulos et al. |
| 2020/0258593 | A1 * | 8/2020 | Badrieh ................. G11C 29/54 |

OTHER PUBLICATIONS

International Searching Authority, "International Preliminary Report on Patentability," issued in connection with International Patent Application No. PCT/CN2021/136269, mailed on Jun. 5, 2024, 5 pages.

The State Intellectual Property Office of People's Republic of China, "Notice of First Examination Opinion," issued in connection with China Patent Application No. 202180004724.1, mailed on Mar. 28, 2025, 14 pages. [English language machine translation included.].

* cited by examiner

SYSTEM AND METHODS FOR MODELING AND SIMULATING ON-DIE CAPACITORS

CROSS-REFERENCE TO RELATED APPLICATIONS

This application claims priority to PCT Patent Application No. PCT/CN2021/136269, filed on Dec. 8, 2021, which is incorporated herein by reference in its entirety.

BACKGROUND

Semiconductor devices are scaled to smaller sizes by improving process technology, circuit designs, programming algorithms, and fabrication processes. The advancement in semiconductor fabrication technology enables chips to use less power per transistor, however, as device density dramatically increases, chips produced with newer processes often use more power. In addition, increasing the functionality of a single chip can also lead to increase in power consumption. Therefore, ensuring power supply integrity is increasingly challenging for chip design and packaging.

BRIEF SUMMARY

Embodiments of methods for simulating power-receiving circuits and systems for performing the same are described in the present disclosure.

In some embodiments, a method for analyzing integrated circuits can include performing a first resistor capacitor (RC) extraction process on a power-receiving circuit to produce a first RC model and scanning a netlist of a power distribution network. The power distribution network is electrically connected to the power-receiving circuit. The method also can include determining a selection of circuit elements of the power distribution network based on a predetermined criteria. The method can further include performing a second RC extraction process on the selection of circuit elements to produce a second RC model. The method can further include performing a simulation process on the power-receiving circuit and the power distribution network using the first and second RC models.

In some embodiments, a method for analyzing integrated circuits can include performing a first resistor capacitor (RC) extraction process on a power-receiving circuit and producing a first RC model. The method can also include selecting a group of circuit elements from a power distribution network and a memory circuit. The method can further include performing a second RC extraction process on the selected group of circuit elements and the memory circuit to produce a second RC model. The method can further include performing a simulation process on the power-receiving circuit, the power distribution network, and the memory circuit using the first and second RC models.

In some embodiments, a computer system includes a processor and a memory having computer program codes stored thereon. The processor is configured to execute the computer program codes in the memory to implement the aforementioned methods.

In some embodiments, a non-transitory computer-readable medium containing computer-executable program for, when being executed by a processor, implementing a method for analyzing signal waveforms produced by an integrated circuit, the method can include performing a first resistor capacitor (RC) extraction process on a power-receiving circuit and producing a first RC model. The method can also include scanning a netlist of a power distribution network, the power distribution network electrically connected to the power-receiving circuit. The method can further include determining a selection of circuit elements of the power distribution network based on a predetermined criteria. The method can further include performing a second RC extraction process on the selection of circuit elements and producing a second RC model. The method can further include performing a simulation process on the power-receiving circuit and the power distribution network using the first and second RC models

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
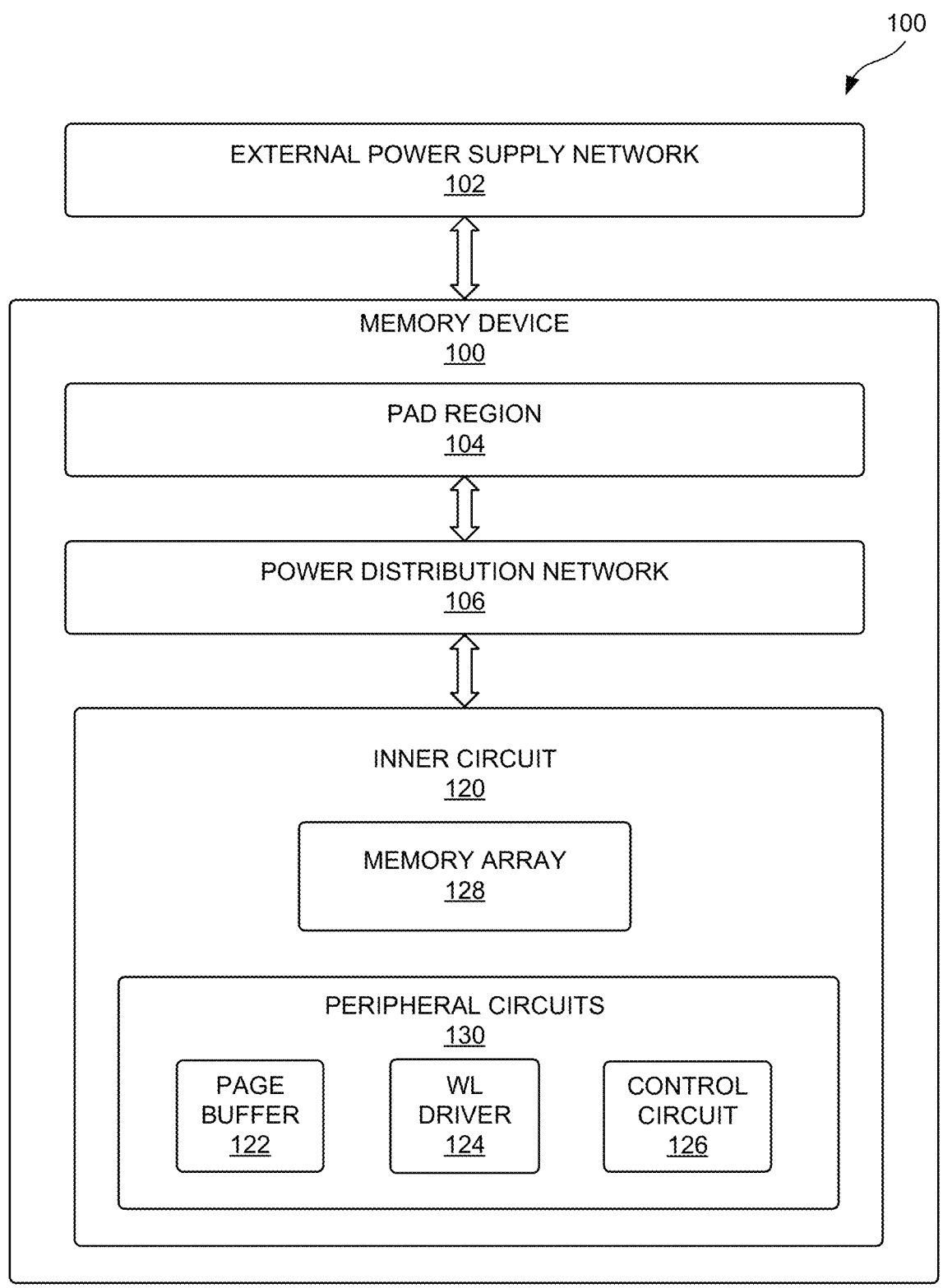
FIG. 1 illustrates a schematic view of an exemplary memory device, according to some embodiments of the present disclosure.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described can include a particular feature, structure, or characteristic, but every embodiment can not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to affect such feature, structure or characteristic in connection with other embodiments whether or not explicitly described.

In general, terminology can be understood at least in part from usage in context. For example, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and may, instead, allow for existence of additional factors not necessarily expressly described, again, depending at least in part on context.

Based on the particular technology node, the term "about" can indicate a value of a given quantity that varies within, for example, 10-30% of the value (e.g., ±10%, ±20%, or ±30% of the value).

Managing power integrity refers to providing a stable power supply that can accommodate fluctuations in current drawn by integrated circuits on a chip. Stable power supply is crucial for the proper operation of high frequency (e.g., high switching rate) devices, such as memory devices. Power-receiving circuits are formed using integrated circuits that contains semiconductor devices such as capacitors, resistors, transistors, and the like. A design flow for designing integrated circuits, such as power supply circuits, typically involves many stages. Transistor-level circuits are designed and circuit-level simulations are performed thereon to ensure that the integrated circuits meet a predetermined specification. For example, electrical analysis is performed to verify and check the electrical behavior and performance of the circuit design. Analysis can be performed on the circuit design to create an estimation of the capacitance and resistance from a process referred to as parasitic resistance and capacitance (RC) extraction. An RC extraction tool includes software and/or hardware that translates a geometric description of conductor and insulator objects, or other shapes described in an integrated circuit design file or database, to associated parasitic capacitance values.

Memory devices, such as volatile and non-volatile memory devices, require one or more power-receiving circuits to operate. For example, power-receiving circuits for memory devices include modules that receives external power supply and provide the power for operating the read and/or write function of physical memory cells as well as modules that provide power for operating input/output (I/O) terminals and databus for transmitting data. For example, a three-dimensional (3D) NAND flash memory device utilizes power supplied through a power-receiving circuit (e.g., a pad region that directly connects to an external power supply circuit) to perform tasks such as data transmission and storage. As the development of memory devices (e.g., 3D NAND flash memory) progress towards high density and high capacity memory cells, the need for stable power supply continues to increase. However, as power supply circuits become more and more complex and larger in scale, the designing and simulating of power-receiving circuits has become increasingly challenging. A power distribution system can include a vast amount of passive circuit components, such as on-die capacitors, resistors, inductors, and the like. In addition, the capacity of memory circuits has also increased tremendously. As a result, a simulation process for an entire power distribution network of a memory device can be extremely time consuming and occupy a significant amount of computation resource. Therefore, there is a need to improve design and simulation efficiency for power circuit designing in memory devices.

Various embodiments in accordance with the present disclosure provide systems and methods for improving the efficiency of modeling and simulating power distribution networks for memory devices without sacrificing simulation accuracy. The simulation results of circuit components of power distribution networks, such as on-die capacitors, can have different high-frequency and low-frequency components. The different components can have different impacts on the circuit simulation result. For example, high-frequency response of on-die capacitors is crucial for accurately simulating the integrated circuits of a 3D NAND memory device. The system and methods disclosed herein can reduce simulation complexity by constructing simplified first-order RC models for the inner circuit and the power distribution network. The simplified models are added to a netlist for subsequent simulation. In some embodiments, a netlist includes a list of electronic components of an electrical circuit as well as a list of terminals/nodes the components can be connected to. The simplified model provides an equivalent on-die capacitor response function that varies with respect to input frequency. The response function can be used by the simulation process to provide simulation results in the low frequency range without sacrificing simulation accuracy, which in turn results in a reduction of simulation time and computation resource. The embodiments described herein can also be applied to the simulation of any other suitable integrated circuits.

FIG. 1 illustrates a schematic view of an exemplary memory device 100, according to some embodiments of the present disclosure. An external power supply network 102 is provided for a memory device 100. Memory device 100 can include a pad region 104, a power distribution network 106, an inner circuit 120, and a control circuit 126. Inner circuit 120 can be a memory circuit that includes a memory array 128 and peripheral circuits 130. Peripheral circuits 130 can include page buffers 122, word line (WL) drivers 124, and control circuit 126. Other components can be included in memory device 100 and are omitted from FIG. 1 for simplicity. The circuit components illustrated in FIG. 1 can be formed on a single chip (e.g., a semiconductor die). Circuit components illustrated in FIG. 1 can be formed using standard cells which includes groups of transistor and interconnect structures.

External power supply network 102 can be used to provide electrical supply to other components of memory device 100. For example, external power supply network 102 can include terminals for outputting power supply voltages, such as $V_{cc}$, $V_{ccq}$, and a ground voltage $V_{ss}$ in order to supply various operating powers to inner circuit 120. Power supply voltage $V_{cc}$ can be a circuit power supply voltage provided as an operation power supply for core electronics of the chip and can be any suitable voltage, such as a voltage between about 1.5 V and about 5 V. Power supply voltage $V_{ccq}$ can be provided to circuit components that are used for data transmission, such as output drivers or in/out (I/O) databus. $V_{ccq}$ can by any suitable voltage, such as a voltage between about 1.2 V and about 3.3 V.

Pad region 104 can be referred to as a power-receiving circuit, which is an integrated circuit that receives external power supply and transmits the received external power supply to power distribution networks. Pad region 104 can also include suitable test ports, interconnects, and conductive lines. Pad region 104 can include power supply terminals (e.g., conductive pads) that receive power from external power supply network 102 and provide power supply to power distribution network 106. Pad region 104 can include conductive pads/regions configured to receive wire bonds for connecting to external power supply network. The conductive pads/regions can be formed of a conductive material, such as copper, aluminum, cobalt, tungsten, any suitable conductive material, and/or combinations thereof.

Power distribution network 106 is a power grid that delivers power and ground voltages from pad region 104 to all components of memory device 100. Power distribution network 106 can include a variety of circuit components, including passive circuit components such as resistors, capacitors, inductors, and active circuit components such as transistors, diodes, generators, current sources, voltage sources, and the like.

Inner circuit 120 includes circuit components configured to perform data processing and storage. For example, inner circuit 120 can include a memory array 128, and a peripheral circuits 130 that includes a page buffer 122, a WL driver 124 and a control circuit 126. Each of the aforementioned circuit component require a stable power supply to perform at an optimal level of device operation.

Page buffer 122 may store data before the data is written to a relevant portion of memory array 128, or store data read from memory array 128 before the data is transmitted to control circuit 126.

WL driver 124 can include local word line drivers and global word line drivers. In high density memory such as 3D NAND memory devices, for example, the arrays of memory cells are divided into blocks of memory cells. Each block may include local word lines, requiring corresponding local word line drivers. A global word line driver powers a set of global word lines for a column of blocks in the array. Each word line in the set of global word lines is set according to the operation being applied to the selected blocks, such as read, program, and erase for high density devices. Word line drivers can include pass transistors which are used to transfer voltages from global word lines to local word lines. Some word line drivers can require high voltages, therefore it is crucial for WL driver 124 to have access to stable power supply for achieving optimal level of device operation.

Control circuit 126 can be a processing unit that includes control logic or processing logic for processing data/before the data is transmitted to memory array 128 or for processing data received from memory array 128. Control circuit 126 can also be configured to control the operation of page buffer 122 and WL driver 124. In some embodiments, control circuit 126 can include an array of logic gates. Control circuit 126 may also include any appropriate type of general-purpose or special-purpose microprocessor, digital signal processor, or microcontroller. Control circuit 126 can be configured as a separate processor module dedicated to performing one or more specific operations. Alternatively, control circuit 126 can be configured as a shared processor module for performing other operations unrelated to the one or more specific operations disclosed herein.

Memory array 128 can include one or more memory planes, each of which can include a plurality of memory blocks. Identical and concurrent operations can take place at each memory plane. Memory blocks, which can be megabytes (MB) in size, can be the smallest size to carry out erase operations. Each memory block can include a plurality of memory cells, where each memory cell can be addressed through interconnections such as bit lines and word lines. The bit lines and word lines can be laid out perpendicularly (e.g., in rows and columns, respectively), forming an array of metal lines. Memory blocks can also be referred to as a "memory array" or "array." The memory array is the core area in a memory device, performing storage functions.

Peripheral circuits 130 can contain many digital, analog, and/or mixed-signal circuits to support functions of memory array 128. In some embodiments, the peripheral circuits 130 can include one or more of a decoder (e.g., a row decoder and a column decoder), a charge pump, a current or voltage reference, or any active or passive components required in the circuits (e.g., transistors, diodes, resistors, or capacitors).

In some embodiments, peripheral circuits 130 can be formed by CMOS technology. In some embodiments, the processes of forming peripheral circuit 130 can include forming high-voltage and low-voltage regions. In some embodiments, P wells, N wells, oxide layers can be formed in the high-voltage and low-voltage regions. A shallow trench isolation (STI) can be used to provide electrical separation between the high-voltage and low-voltage regions. In addition, polysilicon gate structures, silicides, source/drain regions, and other suitable structures can be formed in peripheral circuits 130.

Figure 2:
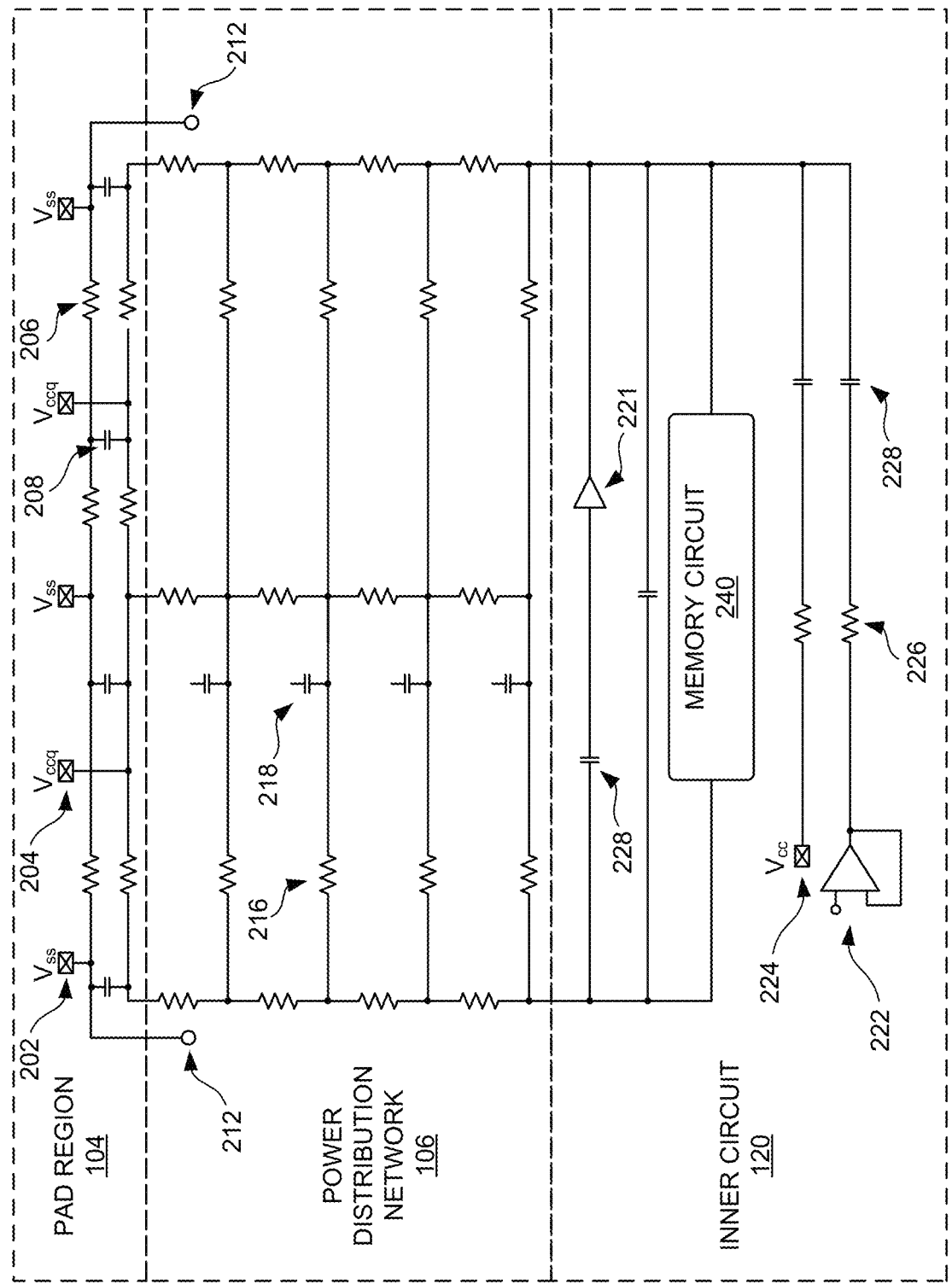
FIG. 2 illustrates a schematic view of a memory circuit diagram, according to some embodiments of the present disclosure.

FIG. 2 illustrates a schematic view of circuitry 200, according to some embodiments of the present disclosure. Circuitry 200 includes a schematic view of pad region 104, power distribution network 106, and inner circuit 120. Circuitry 200 can include additional components and are omitted from FIG. 2 for simplicity. Circuitry 200 is provided to merely illustrate circuit components of memory device 100 and actual circuit design may differ or vary.

Pad region 104 includes one or more terminals for receiving power supply from external power supplies, such as external power supply network 102. In some embodiments, pad region 104 at least includes terminals 202 for receiving a ground voltage reference $V_{ss}$ and terminals 204 for receiving a power supply voltage $V_{ccq}$. Integrated circuits such as memory chips can include more than one power supplies. For example, power supply for memory device 100 can include a first voltage supply $V_{cc}$ for powering the core electronics of the chip and a second voltage $V_{ccq}$ for powering output drivers of the chip. The output drivers transmit the output signals to other chips of the system in which the chip is placed, and draw a large amount of current and power to do so. Pad region 104 also includes various passive circuit elements, such as resistors 206 and capacitors 208. The resistors and capacitors form a portion of an RC network, which is an electric circuit containing resistors and capacitors. It may be driven by a voltage or current source and these will produce different responses.

Power distribution network 106 can include a power grid consisting of resistors and capacitors. For example, power distribution network 106 includes resistors 216 and capacitors 218 and are configured to transmit power supply from terminals 204. In some embodiments, capacitors 218 can be a decoupling capacitor that is connected to a ground reference voltage. In some embodiments, power distribution network 106 is configured as a power bus for voltage supply $V_{ccq}$. In some embodiments, power distribution network can also include power grid for other power supplies, such as $V_{ss}$ power grid that connects to terminals 212 and are omitted from FIG. 2 for simplicity. Power distribution network 106 can include a greater number of circuit components than pad region 104 and is much larger in scale. Other suitable circuit components can be included in power distribution network 106 and are omitted in FIG. 2 for simplicity.

Inner circuit 120 can include resistors 226 and capacitors 228, as well as other circuit components and device blocks. For example, inner circuit 120 can include amplifiers 221, comparators 222, and power terminals 224. Inner circuit 120 also includes memory circuit 240 that includes suitable circuit components, such as page buffer 122, WL driver 124, control circuit 126, memory array 128, and peripheral circuits 130 described in FIG. 1. In some embodiments, memory circuit 240 can be a 3D NAND memory circuit. The components of memory circuit 240 and any additional suitable circuit components are not illustrated in FIG. 2 for simplicity.

The resistors and capacitors placed in pad region 104, power distribution network 106, and inner circuit 120 form an RC network that is vast in scale. Including all the resistors and capacitors in a netlist without simplification would require significant amount of computation resource during the simulation stage of IC design. A method and system for simplifying the modeling and simulation of the RC network described in FIG. 2 is described below with respect to FIGS. 3-5.

Figure 3:
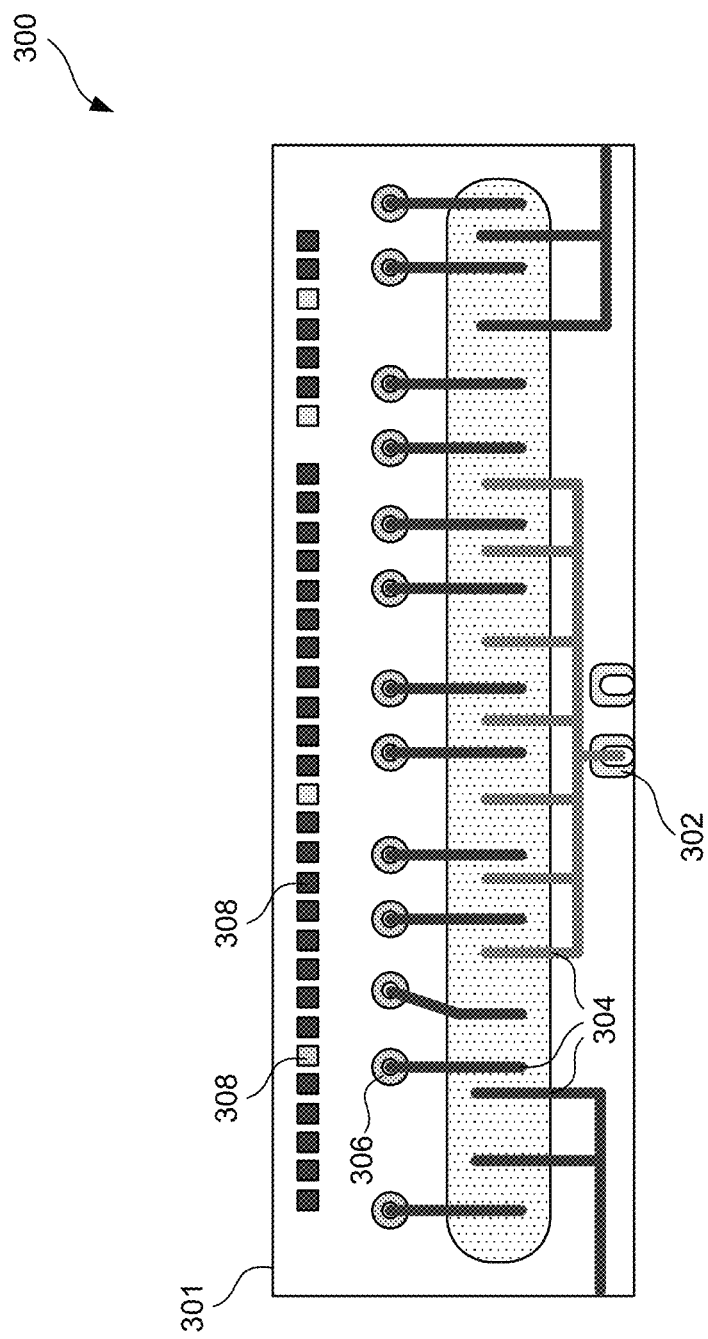
FIG. 3 illustrates a schematic layout view of an exemplary power-receiving circuit, in accordance with some embodiments of the present disclosure.

FIG. 3 illustrates a schematic layout view of die pad 300, according to some embodiments of the present disclosure. Die pad 300 can be a portion of pad region 104 described with respect to FIG. 2. Die pad 300 can include a circuit base 301, test ports 302, conductive lines 304, terminals 306, and interconnects 308. One or more test ports 302 is formed on circuit base 301 for connecting memory device 100 to a computer system that is configured to perform circuit analysis and simulation. Conductive lines 304 can be used to conduct electrical signals between circuit components on die pad 300. In some embodiments, conductive lines 304 can be wire bonds. Terminals 306 can be connection ports that provide electrical connections to circuit components of memory device 100, such as power distribution network 106 and inner circuit 120. Interconnects 308 can be vertical interconnects that provide electrical connections to circuit components formed on various device layers. In some embodiments, interconnects 308 can be through-silicon vias (TSVs).

Figure 4A:
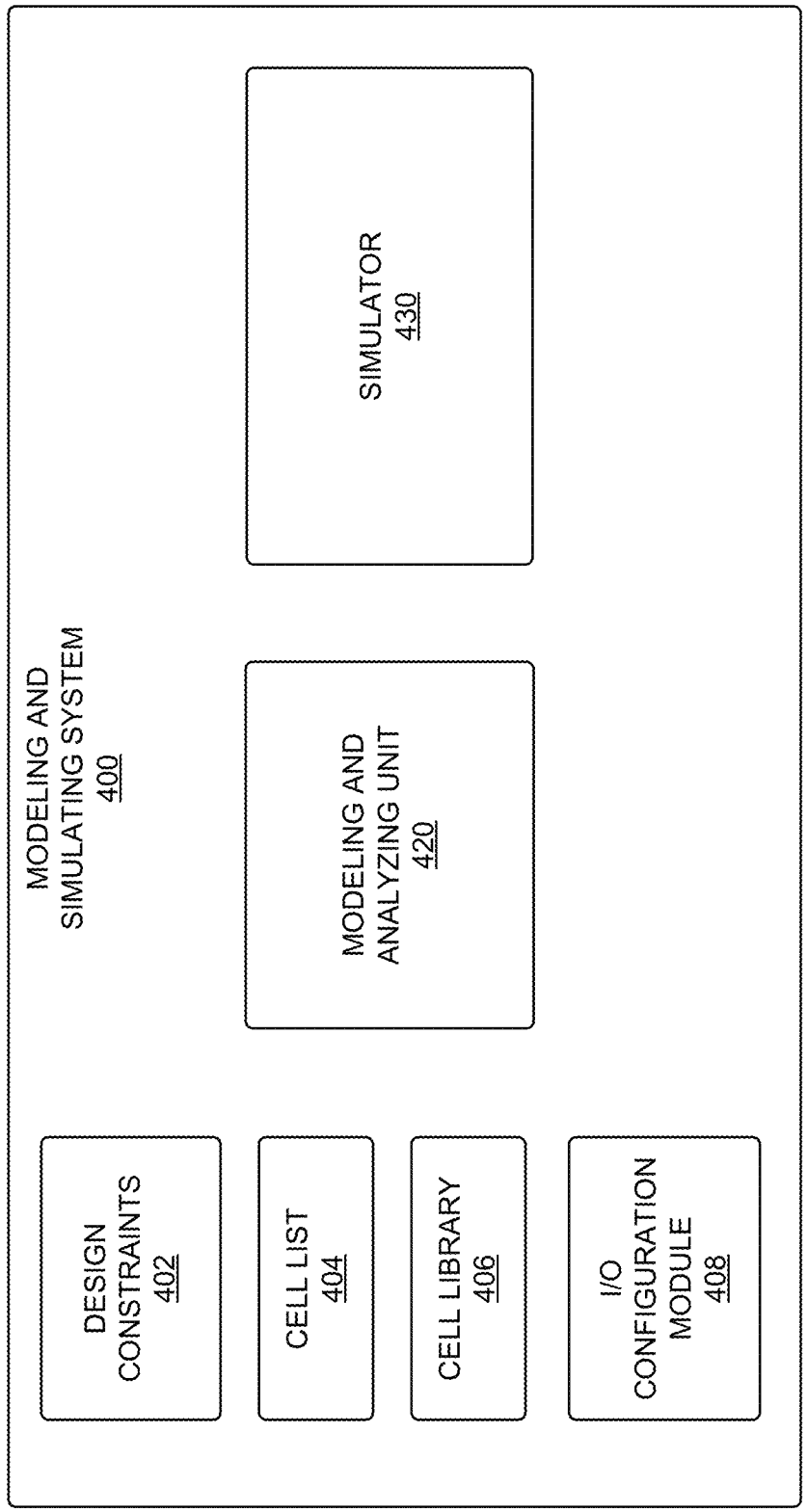
FIG. 4A illustrates a schematic view of an exemplary modeling and simulating system, according to some embodiments of the present disclosure.
Figure 4B:
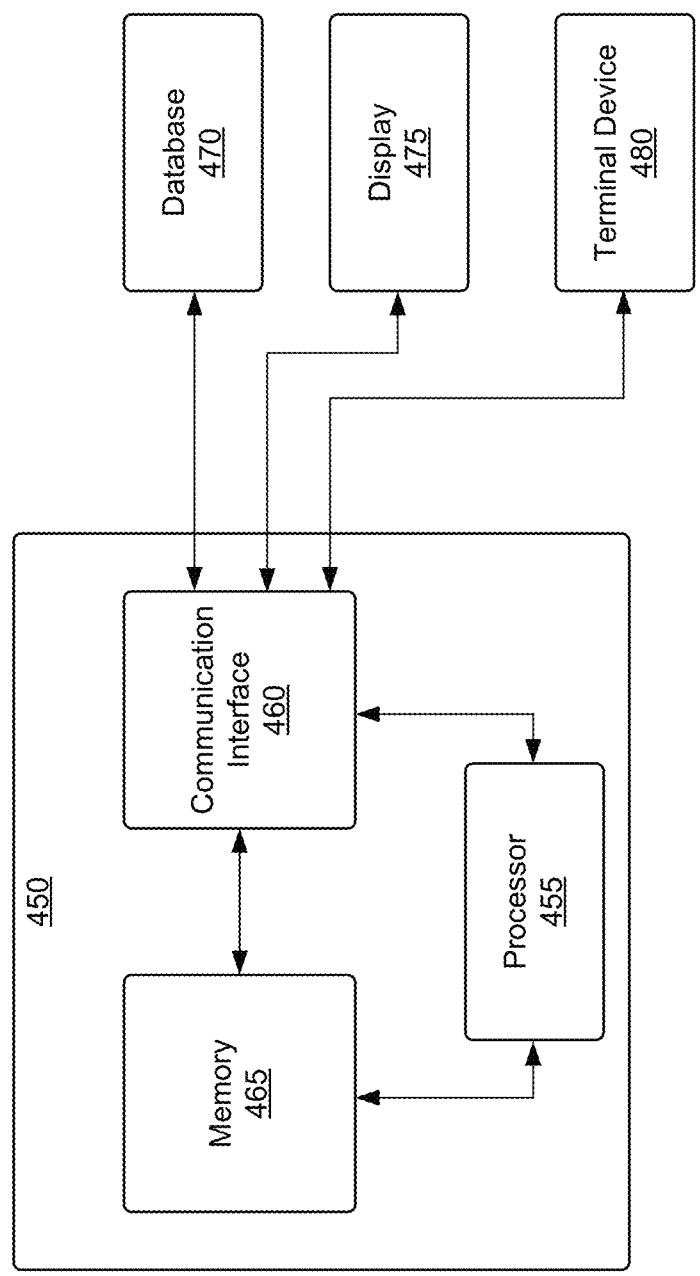
FIG. 4B illustrates a block diagram of an exemplary computer system implementing an exemplary modeling and simulating system, according to some embodiments of the present disclosure.

FIG. 4A illustrates a schematic view of an exemplary modeling and simulating system 400 and FIG. 4B illustrates a block diagram of an exemplary computer system implementing modeling and simulating system 400, according to some embodiments. Additional suitable components can be included in FIGS. 4A and 4B and are not illustrated for simplicity.

Modeling and simulating system 400 illustrated in FIG. 4A can include design constraints 402, a cell list, 404, a cell library 406, an I/O (input/output) configuration table 408, a modeling and analyzing unit 420, and a simulator 430. Other components can be included in modeling and simulating system 400 and are omitted for simplicity. Modeling and simulating system can be executable by a processor in a computer and stored in a non-transitory computer-readable storage medium in the computer. The non-transitory computer-readable storage medium may be a hard disk drive, an optical disc, random-access memory, read-only memory or another non-volatile memory. Modeling and analyzing unit 420 includes at least one processor and at least one memory storing instructions. The instructions, when executed by the at least one processor, cause the at least one processor to perform operations.

Design constraints 402 illustrated in FIG. 4A contains rules that are applicable to integrated circuit designs. For example, design constraints 402 can include design rules such as requirements or parameters related to desired system specifications, budget, requirements, mode settings, and the like. Design constraints 402 can be stored in a storage medium and accessed by other components of modeling and simulating system 400. The design constraints can be logic values or analog values. In some embodiments, design constraints can include input and output constraints of input and output pins of a standard cell.

Cell list 404 and cell library 406 illustrated in FIG. 4A contain standard cell information for use in integrated circuit design. Cell list 404 can include a sorted list of pointers to all cells stored in cell library 406, where the cells are preferably sorted by one or more categories. Cell library 406 can include a collection of standard cells in various formats, such as a netlist format for use in a Simulation Program with Integrated Circuit Emphasis (SPICE) simulation process or any other suitable simulation processes.

I/O configuration table 408 illustrated in FIG. 4A includes a list of input pins and output pins of each cell in cell list 404. I/O configuration table 408 can be generated according to cell list 404 by an I/O configuration table script and modified by a user input received from an input device such as a keyboard, a touchscreen, a microphone, or the like. I/O configuration table 408 can be used to generate input stimuli and other configuration files for subsequent simulations.

Modeling and analyzing unit 420 illustrated in FIG. 4A can perform a variety of duties such as performing resistance and capacitance (RC) extraction processes for an IC circuit, constructing circuit models based on the extracted RC information, and/or providing equivalent impedance function of the circuit elements. Electronic circuit extraction refers to the process of converting an integrated circuit back into a netlist of circuit elements it is intended to represent. The extracted circuit can be used for various purposes, such as circuit simulation, timing analysis, signal integrity analysis, power integrity analysis, logic to layout comparison, etc. RC extraction results in particular, is essential for producing reliable and accurate simulation results for power integrity analysis for memory circuits.

The RC extraction processes can be performed for a component of an IC circuit or for the entire IC circuit. The RC extraction process can be performed by a suitable tool stored in modeling and analyzing unit 420, such as an electronic design automation (EDA) tool. The RC extraction is performed to determine various circuit parameters, such as parasitic resistance and parasitic capacitance of circuit components. In some embodiments, the RC extraction is performed to obtain parameters of resistors and capacitors in power supply circuits such as pad region 104 and power distribution network 106 as described with respect to FIG. 2. In some embodiments, the RC extraction is also performed for inner circuit 120. The RC extraction can obtain information on coupling capacitances as well as parasitic capacitances and their corresponding frequency responses. Parasitic capacitance occur as a result of pattern configurations in the circuit layout and affects device performance. In some embodiments, a technology file is used to extract parasitic parameters. Parameters from the extracted complete and simplified RC models are added to the netlist stored in cell library 406 to produce a modified netlist. In some embodiments, modeling and analyzing unit is configured to produce frequency-dependent S, Z, and Y parameters for different components of the memory circuit. For example, simulator 430 can be configured to determine effective capacitances of components of power supply network in response to different operation frequencies.

Simulator 430 illustrated in FIG. 4A is configured to replicate behavior of an actual integrated circuit by using mathematical models constructed by modeling and analyzing unit 420. Simulator 430 is configured to perform a series of simulation operations on the netlist from one or more circuit components, such as pad region 104, power distribution network 106, and inner circuit 120. Simulator 430 can acquire standard cell information such as cell netlist from cell list 404 and cell library 406, and perform circuit-level simulations to produce a simulation result. In some embodiments, simulator 430 is configured to use any suitable tools to generate timing reports, perform timing preserved optimization, and/or perform timing centric routing.

FIG. 4B illustrates an exemplary computer system 450 for implementing an exemplary modeling and simulating system such as modeling and simulating system 400, according to embodiments of the disclosure. Referring to FIG. 4B, computer system 450 can include at least one processor 455, a communication interface 460, and a memory 465. Memory 465 can be configured to store one or more computer instructions that, when executed by processor 455, can cause processor 455 to perform various operations disclosed herein. Memory 465 can be any non-transitory type of mass storage, such as volatile or non-volatile, magnetic, semiconductor-based, tape-based, optical, removable, non-removable, or other type of storage device or tangible computer-readable medium including, but not limited to, a ROM, a flash memory, a dynamic RAM, and a static RAM.

Processor 455 can be configured to perform the operations in accordance with the instructions stored in memory 465. Processor 455 can include any appropriate type of general-purpose or special-purpose microprocessor, digital signal processor, or microcontroller. Processor 455 can be configured as a separate processor module dedicated to performing one or more specific operations. Alternatively, processor 455 can be configured as a shared processor module for performing other operations unrelated to the one or more specific operations disclosed herein. Processor 455 can include various units or modules for performing circuit modeling and simulating. For example, processor 455 can include modeling and analyzing modules, circuit simulators, I/O configuration modules, and/or any suitable modules for receiving circuit information and performing circuit simulation and analyzation. For example, processor 455 can include processor modules dedicated to performing the operations conducted by I/O configuration module 408, modeling and analyzing unit 420, simulator 430, and any other suitable components of modeling and simulating system 400.

Communication interface 460 can include any type of communication adaptor, such as an integrated services digital network (ISDN) card, cable modem, satellite modem, or a modem to provide a data communication connection. As another example, communication interface 460 can include a local area network (LAN) card to provide a data communication connection to a compatible LAN. Wireless links can also be implemented by communication interface 460. In such an implementation, communication interface 460 can send and receive electrical, electromagnetic or optical signals that carry digital data streams representing various types of information via a network. The network can include a cellular communication network, a Wireless Local Area Network (WLAN), a Wide Area Network (WAN), or the like. In some embodiments, communication interface 460 can also include input/output interfaces, such as display interface (e.g., HDMI, DVI, VGA, etc.), audio interface, keyboard interface, mouse interface, printer interface, touch screen interface, etc.

Communication interface 460 can be configured to exchange information between computer system 450 and one or more other systems/devices. For example, communication interface 460 can communicate with a database 470, which can store information related to integrated circuit designs, standard cell information, routing rules, or the like. In some embodiments, database 470 can also store information related to cell lists, cell libraries, device constraints, or other suitable information related to the design and simulation of integrated circuits. In some embodiments, processor 455 can receive information stored in database 470 through communication interface 460.

A display 475 can be coupled to computer system 450 through communication interface 460. Display 475 can include an LCD, an LED, a plasma display, or any other type of display, and provide a GUI presented on the display for user input and data depiction. Display 475 can be formed of different types of materials, such as plastic or glass, and can be touch-sensitive to receive inputs from the user. For example, display 475 can include a touch-sensitive material that is substantially rigid or substantially pliable. In some embodiments, information about circuit simulation results, threshold values, model information, and/or user input requests can be displayed on display 475. In some embodiments, an alert may be triggered and shown on display 475 after one or more operations performed by processor 455 are completed.

A terminal device 480 can be coupled to computer system 450 through communication interface 460. Terminal device 480 can include a desktop computer, a workstation, a laptop computer, a mobile phone, a tablet, or any other type of device configured to perform computational tasks. In some embodiments, a user can use terminal device 480 to control computer system 450, for example, to initiate, monitor, or terminate operations related to reviewing and analyzing circuit simulation results. In some embodiments, terminal device 480 can receive information about circuit simulation and analysis results generated by computer system 450. In some embodiments, terminal device 480 can receive notification or alerts indicating the status of operations performed by processor 455.

One or more of database 470, display 475, and/or terminal device 480 can be part of computer system 450, and can be co-located with computer system 450 or located remotely with respect to computer system 450 and communicate with computer system 450 via a network or any suitable type of communicate link.

Figure 5:
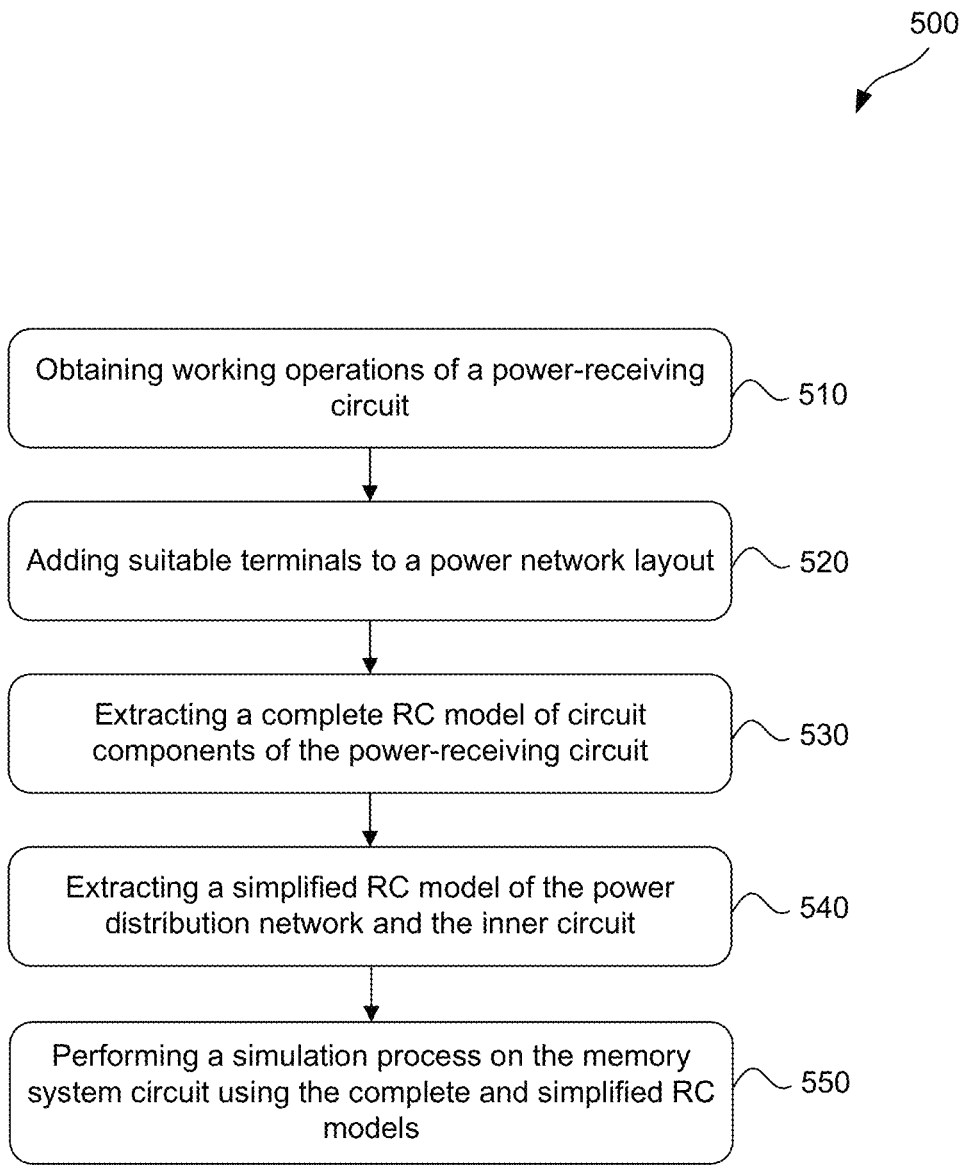
FIG. 5 illustrates an exemplary method of analyzing and simulating integrated circuits, according to some embodiments of the present disclosure.

FIG. 5 is a flow diagram of an exemplary method 500 for modeling and simulating power supply networks in memory devices, in accordance with some embodiments of the present disclosure. The operations of method 500 can be performed in a different order and/or vary, and method 500 may include more operations that are not described for simplicity. Any reasonable application of method 500 in circuit simulation is within the scope of this disclosure.

At operation 510, an initial simulation process is performed to obtain working operations of a power-receiving circuit, according to some embodiments of the present disclosure. Referring to FIG. 4, simulator 430 can be configured to retrieve standard cell information of one or more circuits of the memory device. For example, simulator 430 can retrieve elements of a power-receiving circuit (e.g., pad region 104) from cell list 404 and cell library 406. For ease of description, a power-receiving circuit in the present disclosure refers to a circuit structure directly receiving power from an external power supply circuit. Circuit response during operation startup can be different from circuit responses during regular operations. Therefore, the initial simulation process is performed to simulate operating parameters of circuits during normal operation. In some embodiments, the initial simulation process performed on pad region 104 can avoid initial circuit conditions that may have an impact on the determination of the effective resistance of pad region 104.

At operation 520, the modeling and analyzing system can be configured to add suitable terminals to the power network layout, according to some embodiments of the present disclosure. Modeling and analyzing unit 420 is configured to add terminals to the power network layout for various reasons. Referring to FIGS. 3 and 4, modeling and analyzing unit 420 is configured to add vias 308 on the layout of die pad 300 to resemble the final power bus layout. Vias 308 can be used to provide electrical connection to $V_{ccq}$ power distribution network as described in FIG. 2. In some embodiments, any suitable labels and/or pins can be added to die pad 300 described with respect to FIG. 3. For example, pins can be added on test ports and/or terminals 306 such that external power supplies can be applied for simulation. In some embodiments, modeling and analyzing unit 420 can be configured to add pins to power distribution networks such that simulator 430 can incorporate simplified RC models into the simulation process through the added pins.

At operation 530, the modeling and analyzing system is configured to extract a complete RC model of circuit components of a power-receiving circuit, according to some embodiments of the present disclosure. Referring to FIGS. 3 and 4, modeling and analyzing unit 420 is configured to perform RC extraction on a power-receiving circuit (e.g., pad region 104) in both low frequency (e.g., between about 100 MHz and about 600 MHz) and high frequency spectrums (e.g., between about 600 MHz to about 1 GHz). Extracting complete netlist of circuit components of the pad region is feasible due to the relatively small circuit scale of pad region 104 compared to power distribution network 106 and/or inner circuit 120. Circuit components of pad region 104 such as resistors 206 and capacitors 208 are all included in the RC extraction process and converted into netlists to be stored for subsequent simulation processes. In some embodiments, capacitors 208 can include equivalent parasitic capacitors. In some embodiments, the modeling and analyzing system 420 is configured to use any suitable extraction processes to perform the RC extraction process. For example, the modeling and analyzing unit 420 can utilize model-based RC extraction products to perform the RC extraction process, such as the Quality Resistor Capacitance (QRC) product, available from Cadence Design Systems, Inc. of San Jose, California. The RC extraction results can be stored in any suitable format or medium. For example, the analysis results can be stored in the SPEF, DSPF, or SPICE formats, as would be apparent to persons skilled in the semiconductor art.

At operation 540, the modeling and analyzing system is configured to extract a simplified RC model of circuit components of the power distribution network and inner circuits, according to some embodiments of the present disclosure. To provide fast and accurate power integrity and signal integrity (PI/SI) analysis for the vast scale of power distribution network 106 and inner circuit 120, modeling and analyzing unit 420 described in FIG. 4A is configured to perform an analyzing process to identify circuit elements that meet a predetermined criteria, and perform an RC extraction process on the identified circuit elements to produce a simplified netlist. Modeling and analyzing unit 420 can receive information of circuit elements from cell list 404 and cell library 406 and proceed to scan the circuit elements to identify elements that meet one or more predetermined criteria. In some embodiments, the identified elements are included in the RC extraction process. In some embodiments, the identified elements are excluded from the RC extraction process. The predetermined criteria can include, but is not limited to, a maximum or a minimum resistance value, a maximum or minimum capacitance value, and any suitable criteria. For example, modeling and analyzing unit 420 compares a capacitance of a circuit element (e.g., a capacitor) with a capacitance threshold value, and in response to the capacitance being lower than the capacitance threshold value, exclude the circuit element from the RC extraction process. In contrast, if the capacitance of the circuit element exceeds the capacitance threshold value, the circuit element is included in the RC extraction process.

Further, the modeling and analyzing unit 420 can be configured to perform an RC extraction process on the identified circuit elements and produce one or more sets of RC extraction results that are referred to as simplified RC extraction results or simplified netlist. In some embodiments, the RC model extracted from pad region 104 can be a complete RC model that includes all circuit elements of pad region 104. The RC model extracted from pad region 104 can be used as the RC model in the high-frequency spectrum for the memory device simulation. In some embodiments, the RC model extracted from power distribution network 106 can be a simplified model where certain circuit elements that meet a predetermined criteria is including in the RC extraction process. In some embodiments, an RC extraction process is also performed on inner circuit 120 and a simplified RC model for inner circuit 120 is produced. The RC extraction process for inner circuit 120 can be a part of the RC extraction process for power distribution network 106. In some embodiments, the aforementioned RC extraction processes can be separately performed. In some embodiments, the complete RC model of pad region 104 and the simplified RC model of power distribution network 106 and/or inner circuit 120 are used as a collective RC model in the high-frequency spectrum for the memory device simulation.

The RC extraction process can be limited to the first-order derivative of circuit modeling and configured to exclude derivatives higher than the first-order to provide fast analysis and simulation. For example, the RC extraction process excludes second order or higher derivatives of the RC model. Modeling and analyzing unit 420 can be configured to include frequency-dependent S, Z, and Y parameters for pad regions 104, power distribution network 106, inner circuit 120, and/or any other suitable circuits of the memory device.

Modeling and analyzing unit 420 can be configured to add the RC models of circuit components to the cell library, according to some embodiments of the present disclosure. For example, the extracted complete and simplified RC models are added to the netlist and stored in cell library 406.

At operation 550, the simulator is configured to perform simulations on the memory device circuit using the RC models, according to some embodiments of the present disclosure. Referring to FIG. 4, the simulator 430 can be configured to receive either or both of the complete and simplified RC models from cell list 404 and cell library 406. In some embodiments, simulator 430 can receive the RC models directly from modeling and analyzing unit 420. In some embodiments, the simulator 430 is configured to simulate circuit response based on the received RC models. In some embodiments, the simulator 430 can produce real and imaginary parts of the memory circuit impedance waveform. Simulator 430 can further be configured to provide the effective capacitance of the on-die capacitors based on the imaginary part of the impedance.

Various embodiments in accordance with the present disclosure provide systems and methods for efficiently modeling and simulating power distribution networks for memory devices without sacrificing simulation accuracy. The system and methods disclosed herein can reduce simulation complexity by constructing simplified first-order RC modeling for the inner circuit and the power distribution network. The simplified models are added to the netlist for subsequent simulation. The simplified models provide equivalent on-die capacitor frequency-dependent response function. The response function can be used by the simulation process to provide simulation results in the low frequency range without sacrificing simulation accuracy, which in turn results in a reduction of simulation time and computation resource.

The foregoing description of the specific embodiments will so fully reveal the general nature of the present disclosure that others can, by applying knowledge within the skill of the art, readily modify and/or adapt, for various applications, such specific embodiments, without undue experimentation, and without departing from the general concept of the present disclosure. Therefore, such adaptations and modifications are intended to be within the meaning and range of equivalents of the disclosed embodiments, based on the disclosure and guidance presented herein. It is to be understood that the phraseology or terminology herein is for the purpose of description and not of limitation, such that the terminology or phraseology of the present specification is to be interpreted by the skilled artisan in light of the disclosure and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections can set forth one or more but not all exemplary embodiments of the present disclosure as contemplated by the inventor(s), and thus, are not intended to limit the present disclosure and the appended claims in any way.

The breadth and scope of the present disclosure should not be limited by any of the above-described exemplary embodiments, but should be defined only in accordance with the following claims and their equivalents.

What is claimed is:

1. A method for analyzing integrated circuits, comprising:
    performing a first resistor capacitor (RC) extraction process on a power-receiving circuit in a pad region of a memory device to produce and producing a first RC model, wherein the first RC extraction process is performed at a first frequency and a second frequency, the second frequency higher than the first frequency;
    scanning a netlist of a power distribution network of the memory device, wherein the power distribution network is electrically connected to the power-receiving circuit;
    determining a selection of circuit elements of the power distribution network based on a predetermined criteria;
    performing a second RC extraction process on the selection of circuit elements to produce a second RC model; and
    performing a simulation process on the power-receiving circuit and the power distribution network, wherein power is supplied from the first RC model to the second RC model.

2. The method of claim 1, wherein the first RC extraction process is configured to exclude second or higher derivatives of the first RC model.

3. The method of claim 1, wherein the second RC extraction process is configured to exclude second or higher derivatives of the second RC model.

4. The method of claim 1, further comprising including obtaining operating parameters of the power-receiving circuit.

5. The method of claim 1, wherein determining the selection of circuit elements comprises includes comparing a capacitance of a circuit element to a capacitance threshold value, wherein:
    in response to the capacitance being lower than the capacitance threshold value, exclude the circuit element from the second RC extraction process; and
    in response to the capacitance being greater than the capacitance threshold value, include the circuit element in the second RC extraction process.

6. The method of claim 1, wherein performing the first RC extraction process on the power-receiving circuit comprises includes performing a first-order derivative through a die pad of the pad region.

7. The method of claim 6, further comprising including adding one or more vias on a layout of the die pad to resemble a power bus layout.

8. The method of claim 1, wherein the first RC extraction process is performed in a frequency spectrum from about 100 MHz to about 600 MHZ, or from about 600 MHz to about 1 GHz.

9. A method for analyzing integrated circuits, comprising:
    performing a first resistor capacitor (RC) extraction process on a power-receiving circuit in a pad region of a memory device to produce a first RC model, wherein the first RC extraction process is performed at a first frequency and a second frequency, the second frequency higher than the first frequency;
    selecting a group of circuit elements from a power distribution network of the memory device and a memory circuit;
    performing a second RC extraction process on the selected group of circuit elements and the memory circuit to produce a second RC model; and
    performing a simulation process on the power-receiving circuit, the power distribution network, and the memory circuit, wherein power is supplied from the first RC model to the second RC model.

10. The method of claim 9, wherein the first RC extraction process is limited to performing a first-order derivative of the first RC model.

11. The method of claim 9, wherein the second RC extraction process is configured to exclude second or higher derivatives of the second RC model.

12. The method of claim 9, further including obtaining operating parameters of the power-receiving circuit.

13. The method of claim 9, wherein selecting the group of circuit elements includes comparing a capacitance of a circuit element to a capacitance threshold value, wherein:

in response to the capacitance being lower than the capacitance threshold value, exclude the circuit element from the second RC extraction process; and in response to the capacitance being greater than the capacitance threshold value, include the circuit element in the second RC extraction process.

14. The method of claim 9, wherein performing the first RC extraction process on the power-receiving circuit includes performing a first-order derivative through a die pad of the pad region.

15. The method of claim 14, further including adding one or more vias on a layout of a die pad to resemble a power bus layout.

16. The method of claim 10, wherein the first RC extraction process is performed in a frequency spectrum from about 100 MHz to about 600 MHz, or from about 600 MHz to about 1 GHz.

17. A computer system, comprising: a processor and a memory having computer program codes stored thereon, wherein the processor is configured to execute the computer program codes in the memory to implement the method of claim 1.

18. A non-transitory computer-readable medium containing computer-executable program for, when being executed by a processor, implementing a method for analyzing signal waveforms produced by an integrated circuit, comprising:

performing a first resistor capacitor (RC) extraction process on a power-receiving circuit in a pad region of a memory device to produce a first RC model, wherein the first RC extraction process is performed at a first frequency and a second frequency, the second frequency higher than the first frequency;

scanning a netlist of a power distribution network of the memory device, wherein the power distribution network is electrically connected to the power-receiving circuit;

determining a selection of circuit elements of the power distribution network based on a predetermined criteria;

performing a second RC extraction process on the selection of circuit elements to produce and producing a second RC model; and performing a simulation process on the power-receiving circuit and the power distribution network, wherein power is supplied from the first RC model to the second RC model.

19. The non-transitory computer-readable medium of claim 18, wherein the first RC extraction process is configured to exclude second or higher derivatives of the first RC model.

20. The non-transitory computer-readable medium of claim 18, wherein the second RC extraction process is configured to exclude second or higher derivatives of the second RC model.

* * * * *

UNITED STATES PATENT AND TRADEMARK OFFICE
CERTIFICATE OF CORRECTION

PATENT NO. : 12,321,676 B2
APPLICATION NO. : 17/648782
DATED : June 3, 2025
INVENTOR(S) : Sun et al.

Page 1 of 1

It is certified that error appears in the above-identified patent and that said Letters Patent is hereby corrected as shown below:

In the Claims

In Column 13, Claim 1, Line 60, delete "and producing".
In Column 14, Claim 4, Line 16, delete "comprising".
In Column 14, Claim 5, Line 20, delete "comprises".
In Column 14, Claim 6, Line 30, delete "comprises".
In Column 14, Claim 7, Line 33, delete "comprising".
In Column 16, Claim 18, Line 13, delete "and producing".

Signed and Sealed this
Twenty-sixth Day of August, 2025

Coke Morgan Stewart
*Acting Director of the United States Patent and Trademark Office*